Patented June 11, 1946

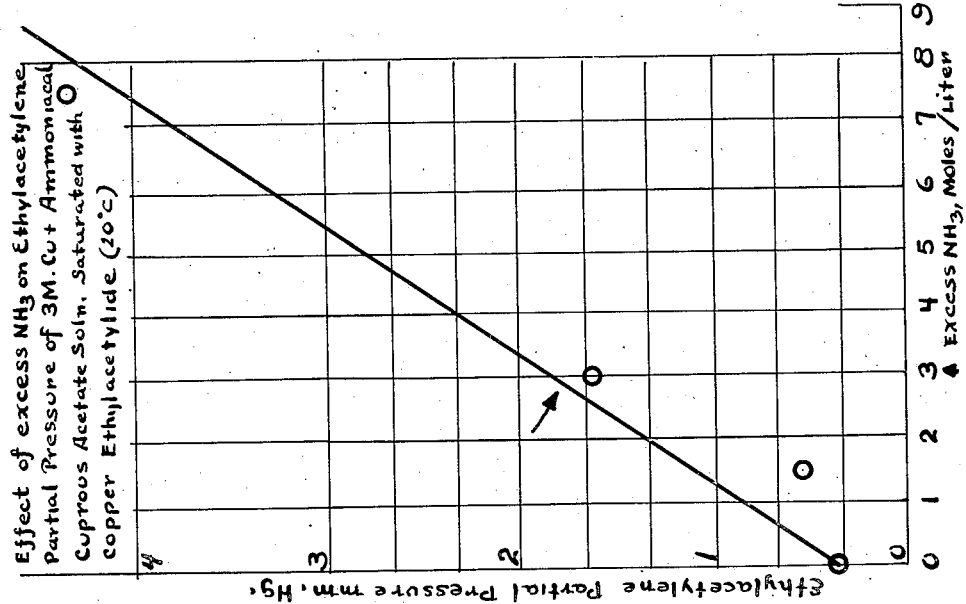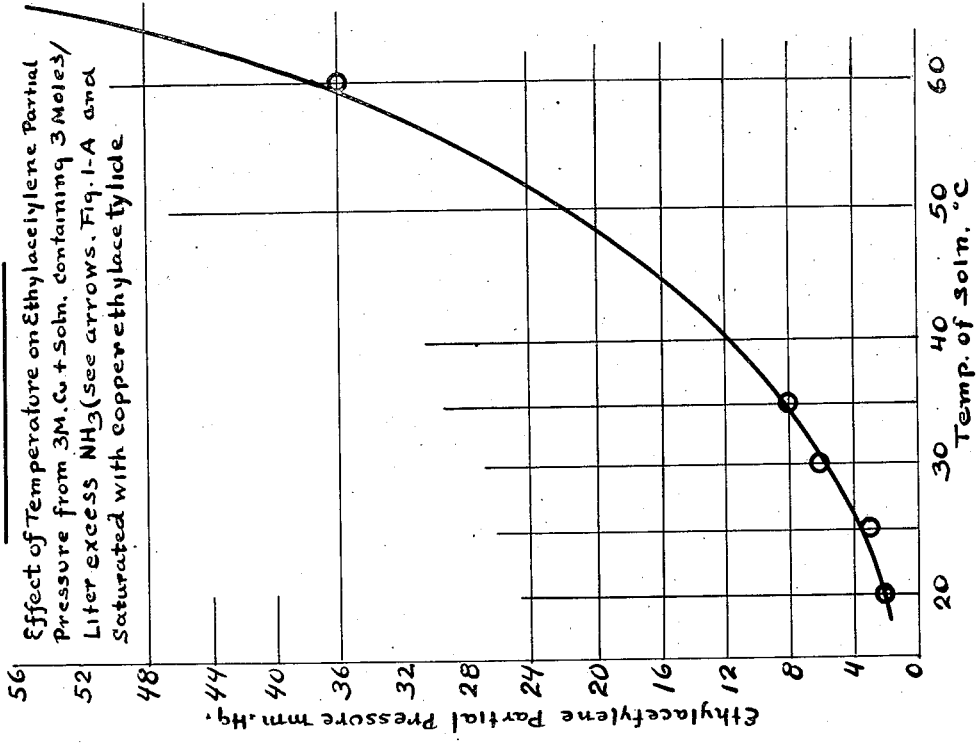

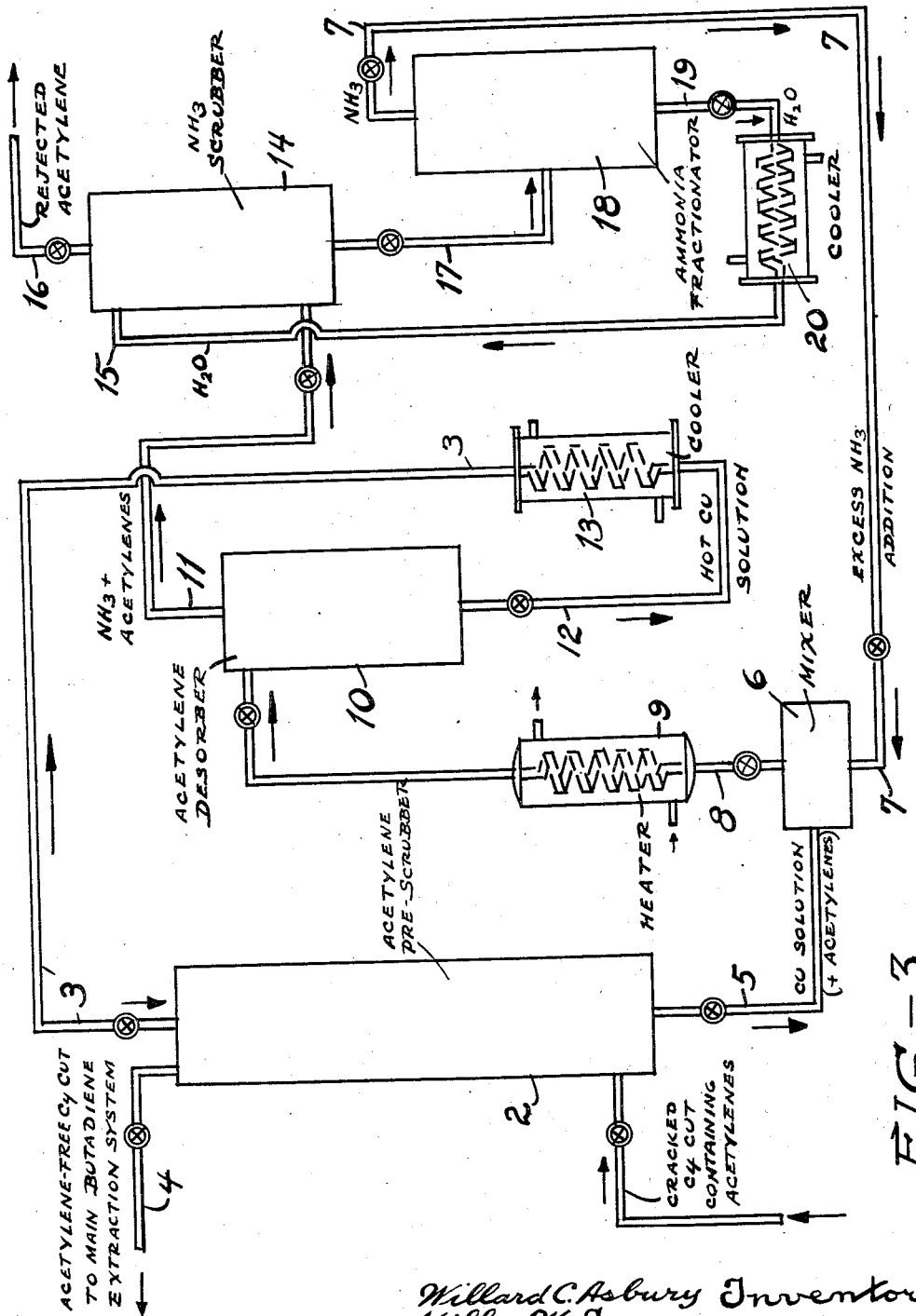

2,401,896

UNITED STATES PATENT OFFICE 2,401,896

REMOVAL OF ALPHA ACETYLENES

Willard C. Asbury, Colonia, and Miller W. Swaney, Linden, N. J., assignors to Standard Oil Development Company, a corporation of Delaware Application September 5, 1942, Serial No. 457,404

7 Claims. (Cl. 260—681.5)

This invention relates to improvements in the separation and segregation of butadiene and particularly in the removal of alpha acetylenes from hydrocarbon gas streams containing saturated and unsaturated hydrocarbons from which butadiene is to be segregated.

In the extraction of butadiene, for example, from acetylene-containing cracked C₄ cuts with basic cuprous salts, there is some tendency for explosive copper acetylides to precipitate directly in the main butadiene extraction system if the concentration of these acetylenes in the feed becomes excessive. The prevention of this precipitation of hazardous materials in the main system where they are not easily accessible, is hereby prevented through the partial or complete removal of these acetylenes in a "pre-scrubber" employing a cuprous salt solution more efficient for removing acetylenes than the copper solution employed in the main extraction system. Every copper solution which contains dissolved copper acetylides possesses a certain "acetylene partial pressure," the magnitude of which depends upon the solution temperature, the solution composition, and the dissolved copper acetylide content. For use in acetylene prescrubbers, then, copper solutions of low acetylene partial pressure are preferred.

An object of this invention is to separate the alpha acetylenes from cracked hydrocarbon mixtures, especially those containing butadiene.

This and other objects of the invention will be understood when the following description is read with reference to the accompanying drawings.

Fig. 1 illustrates the influence of free ammonia on acetylene partial pressure.

Fig. 2 illustrates the influence of temperature on acetylene partial pressure, and Fig. 3 shows diagrammatically a preferred assembly of apparatus and flow material.

Fig. 1 shows the effect, on acetylene partial pressure, of adding excess ammonia to an ammoniacal cuprous acetate solution saturated both with cuprous oxide (3 molar) and with ethylacetylene (app. 0.3 molar). It is seen that with no excess NH₃ (none in excess of that required to hold copper in solution, or a solution capable of dissolving no additional cuprous oxide) the solution saturated with ethyl acetylene possesses an "acetylene partial pressure" of about 0.3 millimeter of mercury. When this solution contains smaller quantities of dissolved acetylenes, its acetylene partial pressure is much less than this amount (approaching 0 mm. Hg with zero acetylene content). Therefore, the ideal copper solution for acetylene removal is an ammoniacal cuprous acetate solution, for example, completely saturated with cuprous oxide or cuprous hydroxide and thus containing no excess ammonia. Furthermore, as is seen from Fig. 2, this prescrubber solution should be used at as low a temperature as possible, since its acetylene partial pressure has been found to increase rapidly with increasing temperatures.

The acetylene prescrubbers may be operated continuously, accompanied by regeneration of these solutions, or removal of acetylenes continuously therefrom. By referring to Fig. 1 and Fig. 2, it is seen that the addition of excess NH₃ and the raising of temperature, both serve to greatly increase the acetylene partial pressures of the solutions. For example, the addition of only 3 moles of excess NH₃ to this solution whose acetylene partial pressure (when saturated with copper acetylide) at 20° C. is only 0.3 mm. Hg (Fig. 1) increases this acetylene partial pressure to more than 30 mm. Hg at 60° C. (Fig. 2). Even larger excesses of ammonia can be added during the regeneration period if desired. The acetylenes may be removed from cracked feeds continuously by the following means, using a cracked C₄ cut containing both butadiene and acetylenes for purposes of illustration:

According to this invention it has been found that when a basic cuprous salt solution is used to prescrub the hydrocarbon mixture to remove the alpha acetylenes, there is developed a certain acetylene partial pressure or dissociation pressure from the copper solution which is greatly influenced by the presence of free or excess ammonia present in the said copper solution. (Excess ammonia is defined as that quantity present in addition to the amount required to maintain the necessary cuprous oxide in solution.) When a basic cuprous salt solution composed of an aqueous solution of three moles per liter of cuprous acetate and 10 moles per liter of total ammonia is used to treat a hydrocarbon mixture containing acetylene and butadiene, the acetylene partial pressure from the copper solution, when equilibrium is attained, is relatively low, but when additional ammonia is added to this solution so as to increase the ammonia concentration by only 2% or 3% by weight, the acetylene partial pressure may be increased as much as 10 to 12 fold. Therefore the acetylenes may be removed by treating a cracked hydrocarbon stream containing butadiene and acetylenes with a basic cuprous salt solution of low ammonia concentration until equilibrium is reached, separating the basic cuprous salt solution with the copper acetylides formed therein, treating with ammonia and flashing off the acetylenes, ammonia and any butadiene that may be present in order to regenerate the cuprous salt solution to its initial composition, which may then be used again to remove more acetylenes from the hydrocarbon mixture containing acetylenes. The separated hydrocarbon mixture substantially free of alpha acetylene may be further extracted with a basic cuprous salt solution in a subsequent operation to separate and segregate butadiene of high purity and substantially free of undesirable alpha acetylenes.

Referring to Fig. 3, a hydrocarbon mixture having 4 carbon atoms to the molecule and containing acetylenes, is introduced by pipe 1 into the bottom of acetylene prescrubber 2. The acetylene prescrubber 2 is partly or entirely filled with an ammoniacal cuprous acetate solution of minimum acetylene partial pressure, namely a solution containing little or no excess ammonia and little or no dissolved copper acetylides. The ammoniacal cuprous acetate solution is introduced into the acetylene prescrubber 2 by means of pipe 3. The acetylene prescrubber 2 is operated cold and the solution circulates downwardly at a slow flow rate compared to the upward rate of the $C_4$ hydrocarbon which may be in the form of a gas or a liquid. The solution entering the top of acetylene prescrubber 2 by means of pipe 3 is the last to contact the substantially acetylene-free $C_4$ hydrocarbon stream which is removed by means of pipe 4 to the main butadiene extraction system. In the acetylene prescrubber the ratios of the feed rates of $C_4$ hydrocarbon to cuprous solution feed rates are such that the cuprous solution removes substantially all of the acetylene from the amount of $C_4$ hydrocarbon feed and at the same time removes a very small proportion of the total butadiene throughput. The copper solution is removed from the acetylene prescrubber by means of pipe 5 containing dissolved and/or solid copper acetylides and is then passed to a mixer 6 wherein any desired quantity of excess ammonia is added to raise the partial pressure of the solution. The excess ammonia is added by means of pipe 7 and the mixture is passed through pipe 8 to heater 9 where the temperature is raised to 60 to 80° C. and flashed into acetylene desorber tower 10 where acetylene and excess ammonia are removed through pipe 11 and the acetylene-free copper solution is removed through pipe 12, passed through cooler 13 and recycled by means of pipe 3 to the acetylene prescrubber 2. The ammonia-acetylene mixture removed through pipe 11 containing some butadiene, is passed to water scrubber 14 and is scrubbed with water introduced through pipe 15, the acetylene being removed from the upper part of the tower by means of pipe 16. The ammoniacal liquid is removed from the bottom of the tower through pipe 17, passed to the ammonia fractionator 18 where ammonia is recovered overhead through pipe 7 and recycled to the mixer 6. Water substantially free of ammonia is removed through pipe 19, passed through cooler 20 and returned by means of pipe 15 to the water scrubber 14.

In the preceding manner, acetylenes are continuously and effectively removed from hydrocarbon streams with no loss or deterioration of copper solution or other agents involved. As shown in Fig. 3 and as described above, this acetylene removal operates continuously. However, it may also be operated as a batch system, and simple drums may be used in place of packed or open towers, and inert stripping gas may be introduced to aid in the stripping or desorption of acetylenes, all without departing from the embodiments of the present invention, since the primary object of this invention is to remove acetylenes from gas streams with copper solutions of low acetylene partial pressures (low excess $NH_3$ content), followed by regeneration of these copper solutions after changing their composition and/or the operation conditions so as to make their acetylene partial pressures greatly larger.

Although the present scheme for removing acetylenes from gas streams containing butadiene is described as applying to cracked $C_4$ cuts prior to the concentration of high-purity butadiene therefrom, it may also be employed in removing acetylenes from high purity butadiene in an "after treat" whether the butadiene be concentrated by copper salt extraction or by other means. It may also be applied to the removal of acetylenes from other cuts, $C_5$, $C_6$, etc., whether they contain diolefins or not.

Other copper amine solutions may be used, the term amine including primary, secondary and tertiary organic amines as well as ammonia. The preferred amines are those which are volatile up to about 150° C., for example methyl amine, dimethyl amine, trimethyl amine, ethyl amine and pyridine.

Example 1

An ammoniacal cuprous acetate solution 3.0 molar in cuprous ion, made by dissolving $Cu_2O$ in an aqueous solution of 4.5 molar ammonia and 5.5 molar ammonium acetate, was stripped with nitrogen until cuprous hydroxide precipitation just began (in other words until the solution became just saturated with CuOH). Pure ethyl acetylene was then added until bright yellow cuprous ethyl acetylide just precipitated. The mixture was then stripped of $NH_3$ with pure nitrogen and finally with several successive portions of fresh nitrogen. In each case, the portions of nitrogen used were of about 60 times the volume of the copper solution. On each of these nitrogen samples which had been brought to equilibrium with the copper solution-copper acetylide mixture, analyses were made for ethyl acetylene content, by means of an apparatus especially suitable for the purpose. The values obtained were 246 parts per million, 183 parts per million and 155 parts per million, respectively, (expressed as molecules of ethyl acetylene per million molecules of nitrogen in the nitrogen atmospheres in equilibrium with the copper solution). This continued drop of ethyl acetylene partial pressures is due to progressive ammonia loss from the solution.

Example 2

To test further the dependence of acetylene partial pressures on ammonia content, 2 cc. of 27% aqueous ammonia were added to 15 cc. of the copper solution resulting from Example 1. When brought to equilibrium with nitrogen, the ethyl acetylene concentration in the nitrogen atmosphere was then found to be equivalent to a concentration 1734 parts of ethyl acetylene per million of nitrogen (on molecular basis).

Example 3

A small amount of solid, dry, cuprous ethyl acetylide was added to 10 cc. of concentrated ammonium hydroxide in a flask. After a few minutes the solid dissolved and enough C₄ pressure was developed in the flask to disengage the stopper. From this solution then the acetylene partial pressure must have been equivalent to an ethyl acetylene concentration in the nitrogen atmosphere of the order of a million parts per million.

*Example 4*

A small amount of solid cuprous ethyl acetylide was dissolved in 10 cc. of 3 N. ammoniacal cuprous acetate solution. No perceptible pressure was developed. Then 10 cc. of concentrated NH₄OH was added. The ethyl acetylene pressure developed was then sufficient to disengage the stopper from the flask.

We claim:

1. The process of separating alkyl alpha acetylenes from hydrocarbon mixtures containing alkyl alpha acetylenes, which comprises treating a hydrocarbon mixture containing alkyl alpha acetylenes with a basic cuprous salt-amine solution to absorb alkyl alpha acetylenes, separating the cuprous solution with alkyl alpha acetylene dissolved therein from the hydrocarbon mixture, adding excess amine to the cuprous solution and heating the cuprous solution to expel alkyl alpha acetylenes and excess amine, and separating the expelled amine from alkyl alpha acetylenes.

2. The process of separating alkyl alpha acetylenes from hydrocarbon mixtures containing alkyl alpha acetylenes which comprises treating hydrocarbon mixtures containing alkyl alpha acetylenes with a basic cuprous salt solution containing an amine which is volatile below 150° C. to absorb alkyl alpha acetylenes, separating the cuprous solution with the alkyl alpha acetylene dissolved therein from the hydrocarbon mixture, adding excess of the amine to the cuprous solution and heating the cuprous solution to expel alkyl alpha acetylenes and excess amine, and separating the expelled amine from alkyl alpha acetylenes.

3. The process of separating alkyl alpha acetylenes from hydrocarbon mixtures containing alkyl alpha acetylenes which comprises treating hydrocarbon mixtures containing alkyl alpha acetylenes with a basic cuprous salt solution containing an amine selected from the group consisting of methyl amine, dimethyl amine, trimethyl amine, ethyl amine and pyridine to absorb alkyl alpha acetylenes, separating the cuprous solution with the alkyl alpha acetylene dissolved therein from the hydrocarbon mixture, adding excess of the amine to the cuprous solution and heating the cuprous solution to expel alkyl alpha acetylenes and excess amine, and separating the expelled amine from alkyl alpha acetylenes.

4. The process of separating and segregating alkyl alpha acetylenes from mixtures of hydrocarbons containing butadiene and alkyl alpha acetylenes which comprises treating a hydrocarbon mixture containing butadiene and alkyl alpha acetylenes with a basic cuprous salt solution of low ammonia concentration to absorb alkyl alpha acetylenes until equilibrium is reached, separating the basic cuprous salt solution with copper alkyl alpha acetylides and butadiene dissolved therein from the hydrocarbon mixture, treating the cuprous solution with copper alkyl alpha acetylides dissolved therein with ammonia and flashing off fractionally the alkyl alpha acetylenes and the ammonia from the cuprous solution.

5. The process of separating and segregating alkyl alpha acetylenes from mixtures of hydrocarbons containing butadiene and alkyl alpha acetylenes which comprises contacting a mixture of hydrocarbons containing butadiene and alkyl alpha acetylenes with a basic cuprous salt solution of low ammonia concentration to absorb alkyl alpha acetylenes, separating the basic cuprous salt solution with butadiene and copper alkyl alpha acetylides dissolved therein from the mixture of hydrocarbons, adding ammonia to the separated basic cuprous salt solution with copper alkyl alpha acetylides dissolved therein, raising the temperature of the separated basic cuprous salt solution, flashing off alkyl alpha acetylenes and ammonia from the separated basic cuprous salt solution and scrubbing the mixture of alkyl alpha acetylenes and ammonia to separate the alkyl alpha acetylenes from the ammonia.

6. The process of separating and segregating alkyl alpha acetylenes from mixtures of hydrocarbons containing butadiene and alkyl alpha acetylenes which comprises contacting a mixture of hydrocarbons containing butadiene and alkyl alpha acetylenes with a cuprous composition containing 3 mols per liter of cuprous ion, 4½ mols per liter of ammonia and 5½ mols per liter of ammonium acetate to absorb alkyl alpha acetylenes, separating the cuprous composition with butadiene and copper acetylides dissolved therein from the mixture of hydrocarbons, adding to the separated cuprous composition 2 mols per liter of ammonia, heating the separated cuprous composition with copper alkyl alpha acetylides dissolved therein to expel a mixture of alkyl alpha acetylenes and ammonia and scrubbing the mixture of alkyl alpha acetylenes and ammonia to separate substantially pure alkyl alpha acetylenes.

7. The process of separating and segregating alkyl alpha acetylenes from butadiene found in mixtures of saturated and unsaturated hydrocarbons which comprises contacting a mixture of saturated and unsaturated hydrocarbons containing butadiene and alkyl alpha acetylenes at about 20° C. with a cuprous composition containing at least 3 mols per liter of cuprous ion, not over 4½ mols per liter of ammonia and 5½ mols per liter of ammonium acetate to absorb alkyl alpha acetylenes, separating the cuprous composition with butadiene and copper alkyl alpha acetylides dissolved therein from the mixture of saturated and unsaturated hydrocarbons, adding to the separated cuprous composition 2 or 3 mols per liter of additional ammonia, and further heating the separated cuprous composition to a temperature of 60 to 80° C., recovering overhead a mixture of alkyl alpha acetylenes and ammonia and scrubbing the alkyl alpha acetylenes and ammonia mixture with water to obtain substantially pure alkyl alpha acetylenes.

WILLARD C. ASBURY.
MILLER W. SWANEY.